No. 820,943. PATENTED MAY 15, 1906.
C. O. WYMAN.
FINGER BAR.
APPLICATION FILED NOV. 6, 1903. RENEWED OCT. 13, 1905.
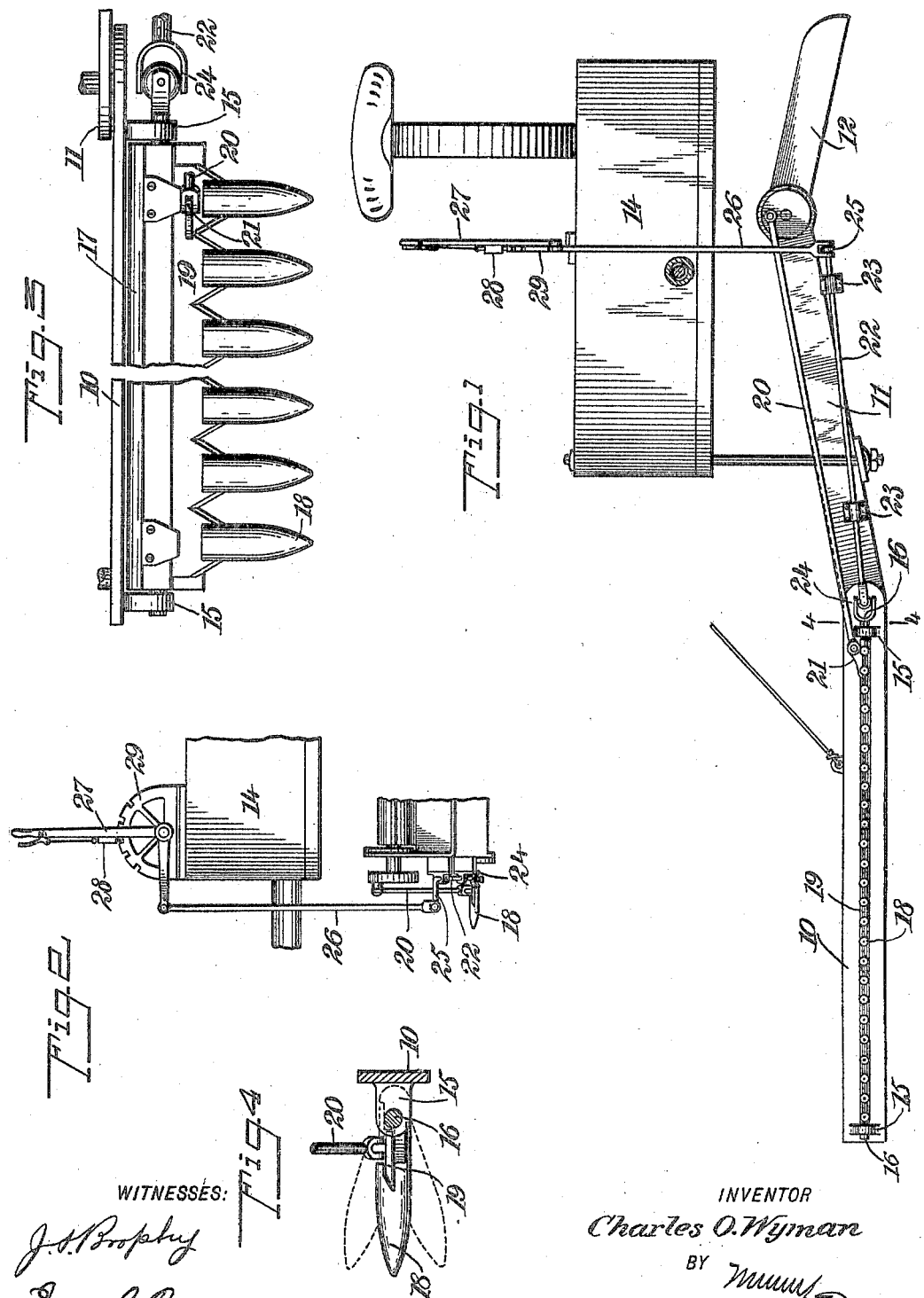
WITNESSES:
J. A. Brophy
Isaac B. Owens.
INVENTOR
Charles O. Wyman
BY
ATTORNEYS

UNITED STATES PATENT OFFICE.

CHARLES O. WYMAN, OF ANOKA, MINNESOTA.

FINGER-BAR.

No. 820,943. Specification of Letters Patent. Patented May 15, 1906.

Original application filed July 1, 1903, Serial No. 163,872. Divided and this application filed November 6, 1903. Renewed October 13, 1905. Serial No. 282,676.

*To all whom it may concern:*

Be it known that I, CHARLES O. WYMAN, a citizen of the United States, and a resident of Anoka, in the county of Anoka and State of Minnesota, have invented a new and Improved Finger-Bar, of which the following is a full, clear, and exact description.

This invention relates to a finger-bar for grain-harvesters.

The prime object of the invention is to provide a finger-bar which may be adjusted around its longitudinal axis so as to change the inclination of the finger-bar and sickle with respect to the ground, thus leaving the stubble long or short without changing the elevation of the harvester-platform.

The present application is a division of my former application for harvesters, filed July 1, 1903, Serial No. 163,872.

This specification is an exact description of one example of the invention, while the claims define the actual scope thereof.

Reference is to be had to the accompanying drawings, forming a part of this specification, in which similar characters of reference indicate corresponding parts in all the views.

Figure 1 is a front elevation of the cutting apparatus of the grain-harvester, this view illustrating the form of self-binding harvester disclosed in my copending application above referred to. Fig. 2 is a side elevation of the devices for adjusting the finger-bar as above explained. Fig. 3 is a plan view of the finger-bar with parts broken away, and Fig. 4 is a section on the line 4 4 of Fig. 1.

10 indicates the harvester-platform, over which the platform-aprons run in the usual manner, and 11 indicates the elevator-frame of the harvester disclosed in my copending application above referred to. 12 indicates the binder-deck of said harvester, and 14 indicates the main framing thereof, all of which parts while adjunctive to are not absolutely essential to the present invention. At each side of the front edge of the platform-frame 10 bearings 15 are located, and in said bearings are mounted trunnions 16, formed on the ends of the finger-bar 17. Said finger-bar carries the fingers 18 and the sickle 19 in the usual manner. It will be observed that by this arrangement the finger-bar may be adjusted, as indicated by the full and broken lines in Fig. 4, and thus the height of the cut may be regulated without the necessity of elevating the entire platform-frame.

20 indicates the pitman, which is provided with a suitable connection 21 with the sickle-bar 19, so as to drive the same, this connection being such as will enable the sickle-bar to be adjusted in the manner described without in any way interfering with the driving of the sickle-bar through the pitman.

22 indicates a rock-shaft suitably mounted in boxes 23 and having a universal connection 24 with the inner trunnion 16 of the sickle-bar. Said rock-shaft 22 has a crank 25 at its end, and to this crank is connected a link 26, which passes upward to an elbow-lever 27, mounted on the framing 14, said lever having a spring-pawl 28 coacting with the toothed quadrant 29, mounted on the frame of the machine. By manipulating this lever 27 the shaft 22 may be rocked in one direction or the other, and in this manner the sickle-bar may be tilted as described. Owing to the universal joint 34, the platform and finger-bar may be raised to vertical position without interfering with any of the connections between the said parts and the parts on the harvester-frame.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination with a harvester-platform, of a sickle-bar mounted thereon to rock around an axis extending longitudinally of the finger-bar, a rock-shaft, a universal connection between the rock-shaft and finger-bar, and means for operating the rock-shaft.

2. In a harvester, the combination of a finger-bar, means for mounting the same to rock around an axis extending longitudinally of the finger-bar and to swing bodily into vertical position, a sickle-bar, means for imparting reciprocal movement to the sickle-bar, a rocking member for imparting said rocking movement to the finger-bar, and a universal connection between the said member and the finger-bar.

3. In a harvester, the combination of a finger-bar, means for mounting the same to rock around an axis extending longitudinally thereof and for mounting the finger-bar to swing bodily into vertical position, a sickle-bar, a pitman connected to the sickle-bar, means for operating the pitman, a rocking member, means for imparting a rocking movement thereto, and a universal connection between said member and said finger-bar, whereby to impart said rocking movement to the sickle-bar.

In testimony whereof I have signed my name to this specification in the presence of two subscribing witnesses.

CHARLES O. WYMAN.

Witnesses:
 WILL A. BLANCHARD,
 G. H. WYMAN.